Oct. 6, 1964  H. H. HAMLIN  3,151,527
BARREL ENGINE

Filed Oct. 5, 1960  6 Sheets-Sheet 1

INVENTOR.
HALLEY H. HAMLIN
BY
*Elver J. Hyde*
ATTORNEY

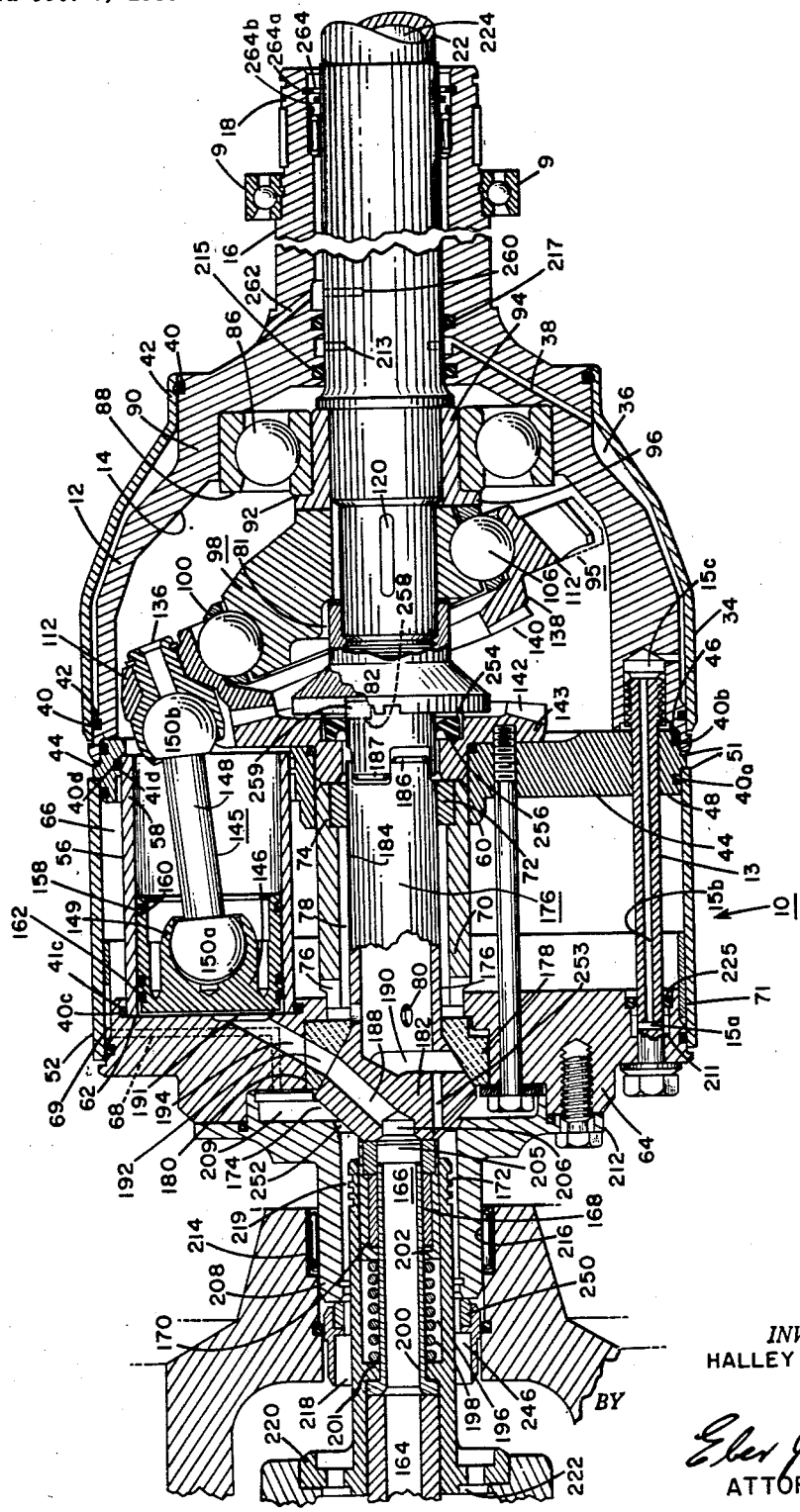

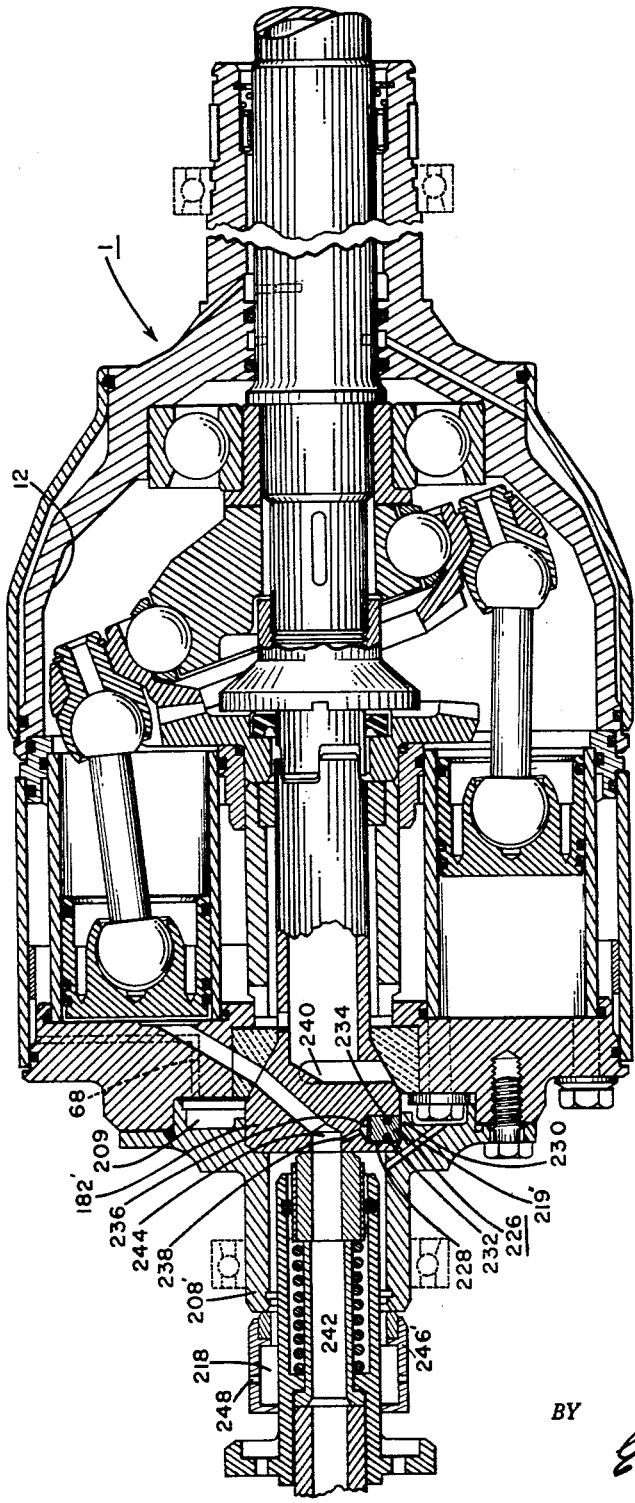

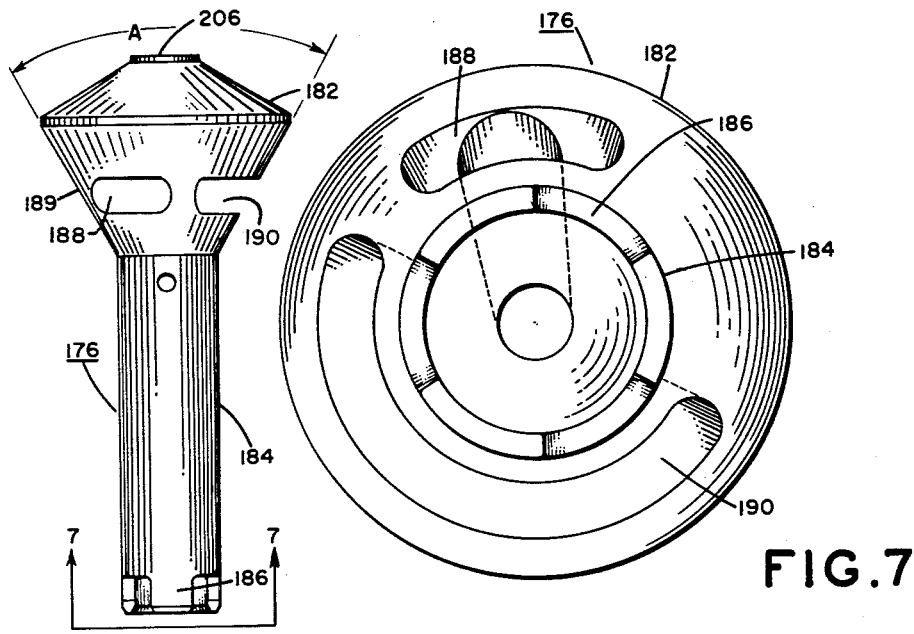
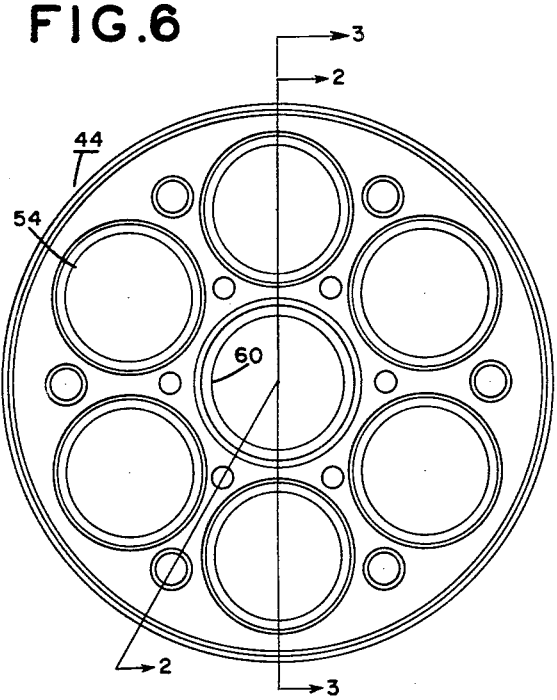
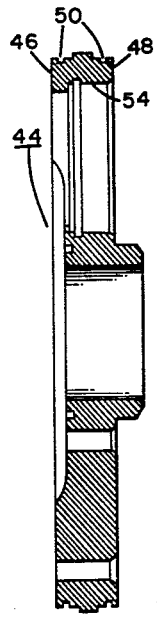
FIG.7
FIG.6
FIG.4
FIG.5
INVENTOR.
HALLEY H. HAMLIN
BY
Eber J. Hyde
ATTORNEY

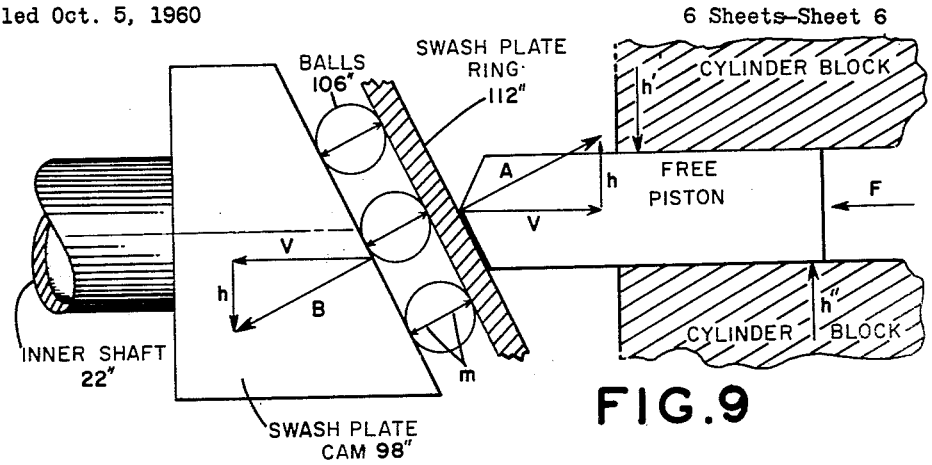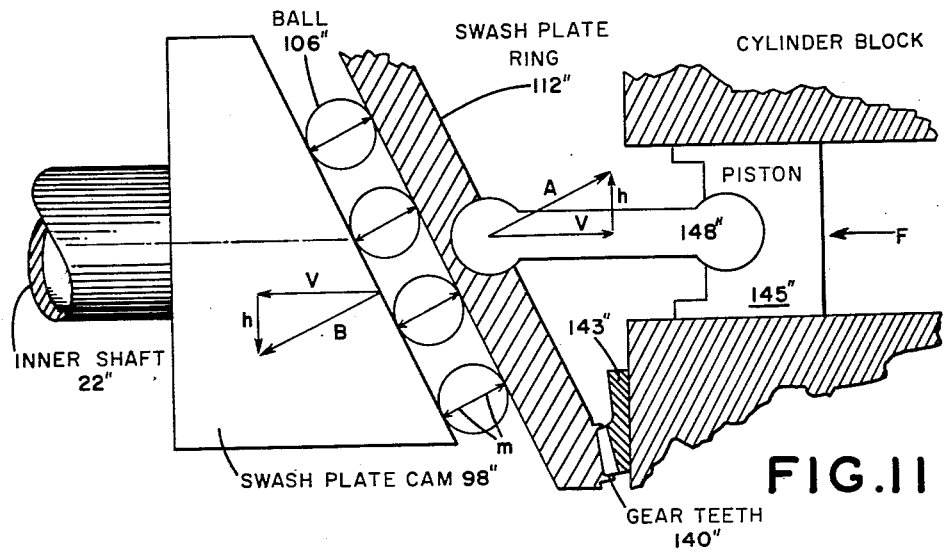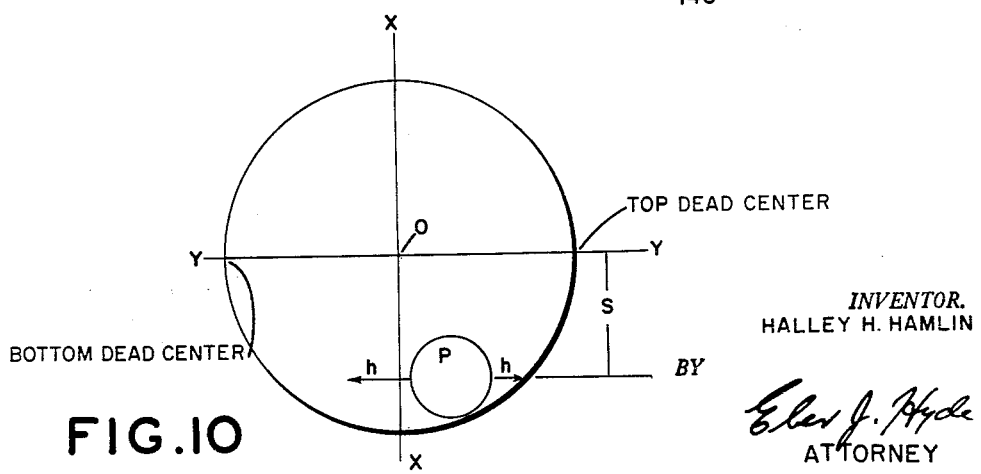

United States Patent Office

3,151,527
Patented Oct. 6, 1964

**3,151,527
BARREL ENGINE**
Halley H. Hamlin, Lyndhurst, Ohio, assignor to
Clevite Corporation, a corporation of Ohio
Filed Oct. 5, 1960, Ser. No. 60,745
13 Claims. (Cl. 91—175)

This invention generally relates to engines and more particularly to barrel engines of the wobble plate or swashplate type, driven by products of a decomposed chemical fuel or compressed air or the like.

As used herein, a wobble plate engine is taken to mean an engine having a plurality of pistons and cylinder assemblies having their stroke axis parallel to and symmetrically disposed to a power output shaft, the pistons coacting with a wobble plate on the shaft so as to impart rotary motion to the shaft in response to staggered linear reciprocation of pistons in their respective cylinders. While the specific embodiments hereinafter described are particularly adapted to operation on a chemical fuel, it is to be understood, that the engine may be employed with equal or similar advantage and facility when utilizing other and more conventional operating mediums, for example, hydrocarbon fuels, compressed air, and the like.

Engines according to the present invention may find application in many and diverse fields with or without modifications readily apparent to persons skilled in the art. For purposes of example and ease of illustration the engine is disclosed as a prime mover for propulsion of Naval torpedoes.

The provision of a suitable propulsion unit for Naval torpedoes, because of the many unique and stringent requirements of such units has presented many long standing problems which heretofore have defied complete solution. Basically, the problems may be classified as being two-fold. First, the adaptation of the engine to provide torque balanced contra-rotating propellers, and secondly a workable engine mechanism. Torque balance between the propellers is required since a lack of it would impose a resisting torque on the torpedo body and would cause the same to roll to one side. It is not possible to position the center of gravity of a torpedo at any substantial distance below its geometric center and the body will roll off to one side rather easily if an unbalanced torque is applied. A permanent inclination of the body is very undesirable since it interferes with steering control functions. Thus for instance, it is well known that torpedo propulsion units must be sufficiently compact to be compatible with the substantially inflexible space limitation imposed by the torpedo hull, and must be capable to deliver a high power output relative to the size and weight of the engine. In recent years the use of electronic guiding equipment, which must also be accommodated within the torpedo hull, has made compactness of the engine an even greater necessity. Similarly, where torpedo guiding equipment is sound responsive the engine must be adapted to generate sound in frequencies not offensive to such guiding equipment. In the past, sound created by gearing mechanism required for adapting the propellers for contra-rotation has been most objectionable.

In the early development of stages of torpedo propulsion units the engine took the form of compressed air motors. These suffered from the handicaps of short range, low speed and bulky air supply. With the development of suitable batteries, electric motors also have been extensively used but these have been subject to some of the same drawbacks as compressed air motors, viz., low horsepower to weight ratio, and hence their use and applicability is limited. In recent years some progress has been made in the utilization of chemical engines which overcome in varying degrees some of the disadvantages of electric and compressed air motors. However such units heretofore have been characterized by short service life, cooling problems and dangers associated with accumulation of decomposed fuel in certain areas of the engine which has led to extensive damages in certain instances.

It is thus the principal object of this invention to provide a unit which overcomes to a large degree the difficulties known in the prior art.

It is a more specific object of this invention to provide a barrel engine having a high horse power to weight and volume ratio, at relatively low speed and high torque.

It is another object of this invention to provide a relatively low speed propulsion unit which obviates the requirement for gear boxes or other speed reducers and for coupling same to the load member.

It is another object of this invention to eliminate various gearing arrangements and other mechanical arrangements for balancing the torque between the counter-rotating propellers.

It is still another object of this invention to accomplish contra-rotation of the propellers by utilizing torque action-reaction principle.

One aspect of the present invention resides in the provision of a barrel engine which includes a first and a second support member (for instance, in the form of the outer housing and the inner shaft of this invention) which are coaxially mounted relative to each other and adapted to establish relative rotation. A fluid pressure inlet is positioned coaxially with respect to the aforesaid support members and is connected to one of such members. The motive power assembly includes a plurality of pistons reciprocally mounted to one of the support members with their stroke axis parallel to the axial center of rotation. The motive power assembly is constructed and arranged to translate the fluid pressure into an axial force component. Secured to one of the support members is a means for converting the axial force component into an angular force component and to apply, effectively, the angular force component upon one support member to establish said relative rotation between the first and the second support member or, alternatively, to apply this angular force component upon both of the support members to rotate one support member in one direction and the other support member in the opposite direction solely by virtue of the reaction to the rotation between the first and the second support member.

For a better understanding of the present invention, together with other and further objects thereof, reference is had to the following description taken in connection with the accompanying drawings, and its scope will be pointed out in the appended claims.

FIGURE 2 is a longitudinal partly sectional view through the propulsion unit, taken along line 2—2 of FIGURE 4;

FIGURE 3 is a similar illustration as shown in FIGURE 2 taken along line 3—3 of FIGURE 4, except that herein features of the conical valve are modified;

FIGURE 4 is a forward view of a portion of the engine called the spider member;

FIGURE 5 is a cross-sectional view of the spider member taken along line 2—2 of FIGURE 4;

FIGURES 6 and 7 are enlarged side and end views of the conical valve member illustrated in FIGURE 2, FIGURE 7 showing the forward end;

FIGURES 9, 10 and 11 are diagrammatic illustrations to facilitate the understanding of the basic principle of this invention.

Introduction

Figure 1:
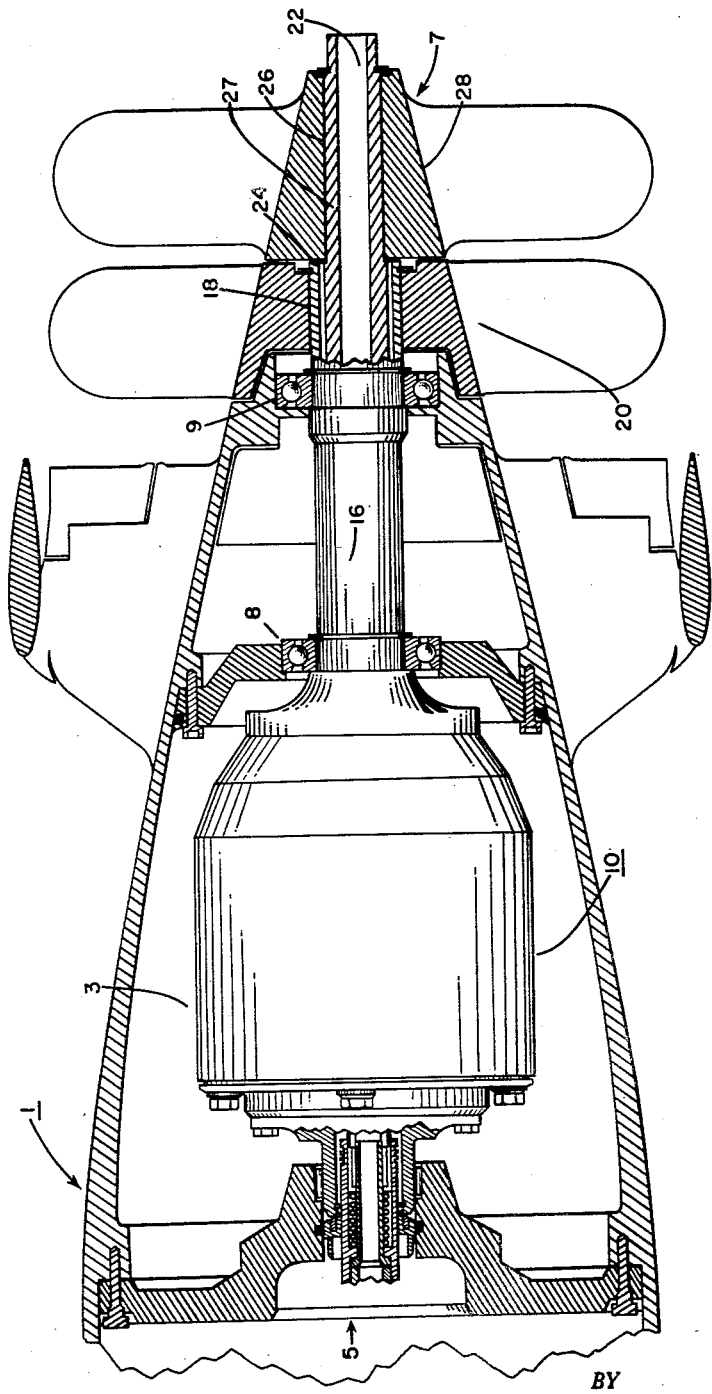
FIGURE 1 is a longitudinal partly sectional view through the aft section of a torpedo, illustrating the device of the present invention as employed in a torpedo.

Referring now to the drawings and more particularly to FIGURE 1, there is illustrated a conventional after-body 1 of a torpedo adapted to rotatably support a barrel engine 3. For ease of description end 5 of the after-body 1 is designated the forward section and end 7 the aft section. The invention is embodied in a barrel engine 3 which comprises a housing 10 containing a fluid pressure responsive mechanism 145 (FIGURE 2) of the reciprocatory piston type, a rotatably mounted inner power take-off shaft 22 and a wobble plate conversion assembly 95 mounted to the inner shaft 22 and connected to the fluid pressure responsive mechanism 145 for converting the reciprocatory substantially linear motion of the fluid pressure responsive mechanism 145 into rotary motion, transmitting the rotary motion to the inner shaft 22 and simultaneously utilizing the torque reaction caused by the reciprocatory movement of pistons 146 to contra-rotate an outer second power take-off shaft 16 which is substantially integral with segments of the housing 10. A fluid pressure supply tube 200 is connected to the housing 10 and is adapted to cooperate with a rotary valve 174 and related components hereinafter described, which sequentially opens and closes flow communication between the fluid pressure supply tube 200 and the fluid pressure responsive mechanism 145 to effect a supply of fluid under pressure to piston heads 146 and to discharge the fluid after the same has functioned to impart reciprocatory movement to the pistons.

Housing

The housing as illustrated herein comprises a plurality of independent sections 12, 34, 44, 52 and 64 which are secured together to form the housing. The sections 12, 44 and 64 are connected by means of bolts 13 arranged in circular array about the central axis of the housing 10 and extending through sections 44 and 64 and into threaded engagement with section 12. The housing section 12 is formed of a semi-spherical hollow body or casing 14 and the integral outer or second tubular power take-off shaft 16. The outer power take-off shaft 16 has a cylindrical outer surface portion 18 adapted to provide a rotatable support means to carry a conventional propeller mechanism assembly 20, as partially shown in FIGURE 1. Outer power take-off shaft 16 is adapted to receive radial load ball bearings 8, 9 which rotatably mount the shaft to the torpedo after-body. The hollow interior of the outer power take-off shaft 16 is adapted to carry rotatably and coaxially the inner tubular power take-off shaft 22. The inner shaft extends into the hollow housing portion 14 and mates therein with conical valve member 176. At the opposite end the inner tubular shaft 22 extends beyond the axial extremity of the outer shaft 16 to provide a rotatable support 26 to coaxially carry a second propeller mechanism assembly 28. The assembly 28 is thus rotatable independently of the first propeller mechanism assembly 20.

A metal cooling jacket 34, see FIGURES 2 and/or 3, is spaced around the engine casing 14 to provide a cooling water passage 36. Water conduits 38 are suitably arranged in the casing as shown, to discharge the coolant from the cooling passage as hereinafter further described. The cooling jacket 34 is attached to the casing by means of suitable screws (not shown) and O-rings 40 radially received in peripherally arranged annular grooves 42 in the casing 14 engage the jacket 34 to prevent water leaks. The section 44 of the housing 10, see detail drawing FIGURE 5, forms a cylindrical spider member, portions 46 of which are received in the hollow cylindrical casing housing 14, and opposite ends of spider member portions 48 are adapted to receive the hollow cylindrical housing section 52, which forms a cooling jacket and is arranged in the same manner as cooling jacket 34. The spider member is peripherally grooved to receive O-rings 40a and 40b which are adapted to sealingly engage the cooling jacket 52 and the casing section 12. The connection between sections 44, 12 and 52 is conveniently accomplished by suitably matching the diameter of the annular recess 50 or shoulder 51 of each respective member, so as to register the cooling jacket 34 and the casing section 12 to the spider member 44 with a press-fit.

The spider member 44 is formed with six openings 54, see FIGURE 4, positioned in circular array about the central axis of the spider, the central axis of each of the openings being substantially parallel to the central axis of hollow cylinders 56, see FIGURES 4 and 5. Each of such spider openings 54 is adapted to rigidly receive an end portion 58 of the piston carrying cylinder 56. Each cylinder 56 is a hollow cylindrical casing and one axial end 58 of each cylinder is mounted to the spider member as aforesaid, and the opposite end 62 is secured to housing section 64 forming a circular engine head. To seal the cylinder into position, an O-ring 40c is secured into an annular groove 41c of the engine head, and an O-ring 40d is secured into an annular groove 41d in the spider member, the O-rings being adapted to peripherally surround the cylinder 56 at its respective ends. A central bore 60 of the spider is adapted to suitably receive a tubular sleeve 70 which has an annular recess 74 to receive and retain a graphitic annular seal 72. The seal 72 is coaxially and rotatably mounted about rotary valve 176. The forward end of the tubular sleeve 70 is formed with a plurality of slots 76 and is mounted in an annular bore portion of the engine head 64. The spider member 44 and the engine head 64 are thus spacedly connected and are further secured together by means of tubular cooling jacket 52 which attaches to the respective ends of members 44, 64.

Internal Mechanism

The inner tubular power take-off shaft 22 is rotatably and coaxially carried within the semi-spherical hollow body portion 14 of casing 12 by means of a ball bearing assembly 86, of which an annular outer race 88 is secured with a pressfit to an internal annular support shoulder 90 of the casing 12, and an inner annular race 92 of the bearing 86 surrounds an annular sleeve 94 interposed between the inner race 92 of the bearing and the shaft 22. The sleeve 94 has an outwardly radially extending flange 96 which is adapted to take up longitudinal thrust from a swashplate cam 98.

The swashplate cam 98 is fixedly mounted to the inner shaft 22 and an annular ball bearing retaining ring 100 is carried on the outer peripheral surface 102 of the cam 97 providing a plurality of radially extending openings 104 adapted to receive in each opening a bearing ball 106. An annular swashplate ring 112 is coaxially mounted to the bearing retaining ring 100. The bearing balls 106 ride in a ball bearing race formed in the shape of an annular groove 108 in the swashplate cam and in a corresponding groove 110 in the annular ring 112. The annular swashplate ring 112 is suitably connected to the reciprocating piston rods 148, as hereinafter described, and the pistons 145 operating in sequence force the swashplate ring 112 into wobble motion and causing torque action upon the swashplate cam 98 which is translated to the inner power takeoff shaft 22 causing it to rotate. Reaction to the positive torque causes a negative torque reaction which effects contrarotation of the fluid pressure responsive mechanism 145 and all other components which are in fixed relationship to fluid pressure responsive mechanism 145 such as housing 10, particularly note power take-off shaft 16.

Figure 8:
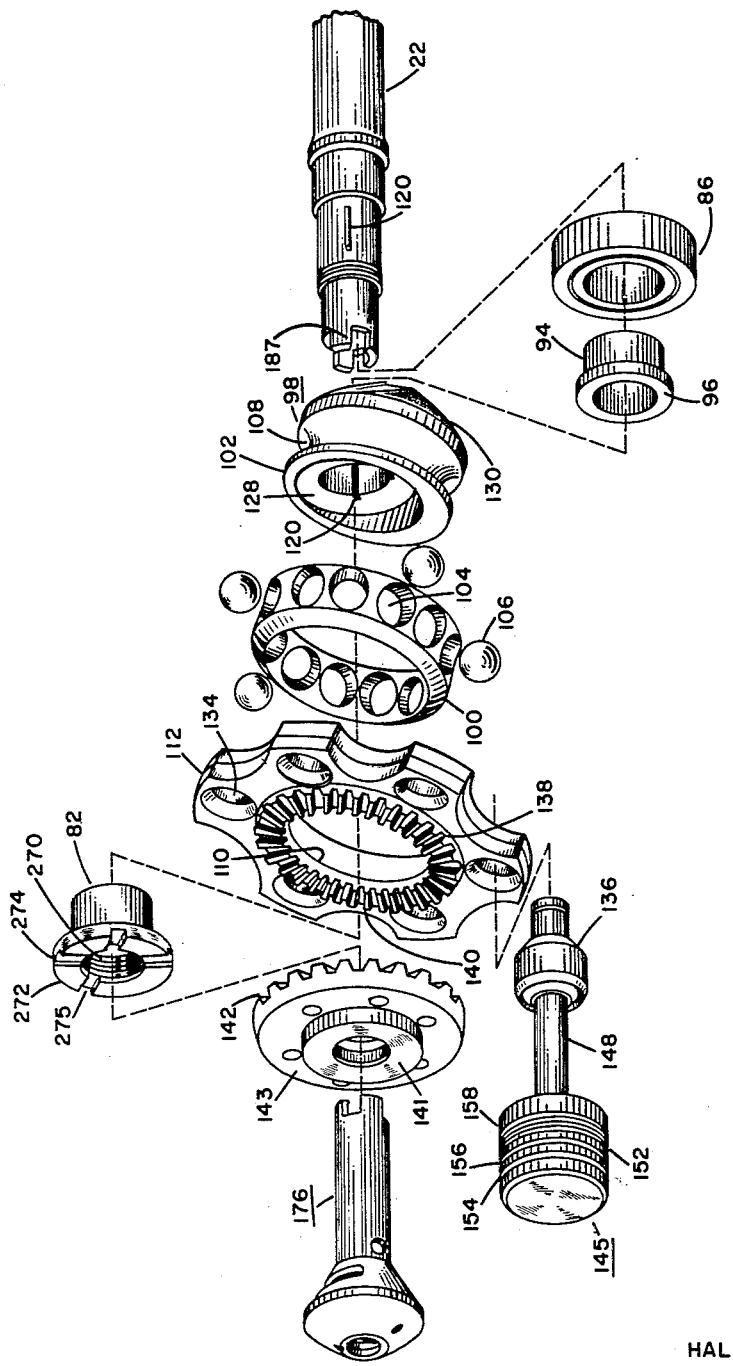
FIGURE 8 is an exploded perspective view of major engine components.

The swashplate cam 98 is secured to the inner shaft 22 by means of a key (not shown) and key slot 120, and at one axial end abuts against the radially outwardly extending flange 96 of the sleeve member 94, and at the opposite end against a centrifugal separating member 82 of substantially tubular form which is threadedly secured to the inner shaft 22 and partially extends into an annular pocket 81 of the swashplate cam 98 to rigidly limit the axial freedom of the latter. The swashplate cam comprises essentially two annular sleeve portions 128 and 130 integrally superimposed upon one another in a relationship permitting annular sleeve 128 to form a skew angle with respect to the central axis of the cam, as is shown in FIGURE 8. The cylindrical outer surface of the sleeve 128 is eccentrically arranged with respect to the central axis of the cam 98 and provides a radial groove 108 to receive partially therein bearing balls 106 which are disposed to carry a combination thrust and radial load and convert the reciprocatory movement of the pistons 146 into rotary movement of the shaft 22. The ball retaining ring 100 is a substantially annular ring and is formed so as to permit an alignment of the axial center of each aperture 104 with the corresponding axial center of the annular grooves 108, 110 of the swashplate cam 98 and ring member 112, respectively.

The annular swashplate ring 112 is provided with six bores 134 arranged in circular array about the central axis of the swashplate ring 112 to receive and secure in each of such openings a bronze ball socket joint 136, by means of which the ring 112 is connected to the reciprocating pistons. A circular face gear plate 138 is integrally arranged with the ring 112 and its teeth 140 are adapted to mesh with teeth 142 of the bevel gear 143 mounted about the inner shaft and connected to the spider member 44 by an annular flange portion 141 which extends into central bore 60 of the spider member. The engagement of the teeth of members 138 and 143 serves to maintain the position of the swashplate ring in suitable relationship with the outer housing 10 and the connecting rods 148, and the interaction of the gear teeth balances the forces imposed on the swashplate ring 112 by the fluid pressure resopnsive mechanism 145.

To balance the centrifugal effect of the eccentric swashplate assembly, and the rotating outer housing 10 (including pistons 146), the inner shaft 22 may suitably be counter-weighted, as for instance by means of an eccentric sleeve attached to the shaft as shown and described in co-pending application U.S. Serial Number 73,456 assigned to the same assignee.

Essentially the fluid pressure responsive mechanism 145 comprises a cylindrical piston 146 which is of suitable annular dimension to slide within the cylinder casing 56. The piston has an integrated socket joint 149 receiving a sphere-like end 150a of a piston rod member 148 which connects the piston 146 to the swashplate ring 112 by way of the ball end portion 150b which is received in bronze ball socket joint 136. The piston may be formed of aluminum or other suitable material. As shown in FIGURE 8 the outer cylindrical surface 152 of the piston 146 has a number of annular grooves of which grooves 154 and 156 each receive a metallic or plastic ring 162 therein, and groove 158 is adapted to receive an O-ring 160. The O-ring 160 has a mupltiple function to perform, acting first as an oil control ring to wipe excess lubricant from cylinder wall as the piston descends to prevent lubricants from penetrating into the fluid supply conduits and from coming into contact with combustible gases. The O-ring 160 further serves to lend a certain degree of radial resiliency to the reciprocating piston member 146. The radial resiliency of the piston reduces frictional abrasion caused in some instances by deposition of solid combustion products in the cylinder casing 56. Radial resiliency of the O-ring 160 is also important in another aspect. The piston head performs reciprocatory linear motion during operation of the propulsion unit 3. However, since the central axis of the piston rods are not at all times parallel with respect to the central axis of the device 3, the force of the piston acting upon the connecting rods produces a slightly radial component of force tending to push the piston against the cylinder wall. Another source of radial interference relates to the centrifugal action arising from contrarotation of the cylinder structure. Hence, the O-ring carries at least a portion of this side burden and protects the metallic parts from frictional damage to provide proper sliding action of the piston in the cylinder. A slight radial clearance is provided between the inside diameter of the cylinder 56 and the outside diameter of the piston, particularly at the location of the piston head. It may be advantageous to use chemical fuel to produce the fluid under pressure in the cylinders. In this event to reduce buildup of solids on the cylinder walls it has been found advantageous to use metallic piston rings 162 capable of lightly scraping the cylinder walls during the reciprocatory motion.

*Fluid Flow Control and Passages*

Hot gas, or other suitable fluid, flows from a combustion chamber, or equivalent (not shown), into a tubular conduit 164 and a hot gas seal assembly 166 and then enters into and through a rotary valve assembly 174. The rotary valve assembly 174 comprises the rotary valve 176 and an annular conical seat 178 of graphitic or other suitable heat resistant material, secured in a cylindrical pocket 180 of the engine head, and into which a conical valve head potrion 182 of the valve 176 is partly inserted. The hot gas seal assembly 166 includes a sealing member 168 encased by an annular steel sleeve 170, movable within a hot gas nozzle 172 to provide the fluid communication means between the hot gas supply chamber and the valve 176.

The valve 176 has a conical valve head 182 and a tubular body portion 184 extending coaxially from the conical head 182. The valve head 182 is of double conical (hexagonal in cross-section) or cylindrical-conical configuration, see FIGURES 2 and 3 respectively, to avoid difficulties usually encountered with cylindrically shaped valves, such as binding in the cylindrical seat as the valve expands when the temperature increases. The angle across the conical portion of head 189 adjacent to valve seat 178 is preferably within the approximate range of 55° to 65°. An angle of 60° works particularly well. The double conical valve head as shown in FIGURES 2, 6 and 7 has the advantage of a small surface contact and is preferred when particularly high temperatures are encountered. The outside diameter of the tubular portion 184 is the same as the outside diameter of the inner shaft 22 and is adapted by means of axially protruding teeth 186 to mate with similarly protruding teeth 187 of the inner shaft 22. The interlocking of these teeth establishes a connection between the two members that when the inner shaft 22 is caused to rotate the conical valve 176 member is forced to rotate in unison with the shaft. The conical portion 182 of the valve 176, see FIGURE 2, is formed with inlet and outlet ports 188, 190. The ports provide, in conjunction with ports 192, 194 which are formed in the valve seat and the engine head respectively, a communicating passageway between the hot gas seal 166 and the small chamber 191 in the engine head 64, and a flow connection between the cylinders and the tubular portion 184 of the valve.

The sealing member 168 is substantially tubular and preferably made of heat resistant material such as graphite. The stainless steel sleeve 170 is in essence a protective casing around the sealing member. The seal and the surrounding sleeve are tightly attached to each other and are movable within tubular passageway 196 of nozzle 172 toward and away from the valve head 182. However, the sealing member 168 is limited in its freedom of rotary motion. The sealing member is keyed (not shown) to the hot gas nozzle by installing a pin in the wall of the hot gas nozzle, the pin projecting inwardly through the wall of the sealing member, a rectangular slot is cut into the outer circumference of the sealing member for engagement with the pin, the slot thus enables axial movement but prevents any rotary motion. A spring member 198 concentrically surrounds a feed tube 200 within the passageway 196 of the hot gas nozzle and the spring 198 is positioned to engage an internal annular shoulder 201 of the nozzle and reacts against an inwardly extending flange 202 portion of sleeve 170, thereby biasing the hot gas seal to maintain initial contact between the sealing members and the conical valve head. The feed tube 200 registers coaxially with the central aperture 206 of the conical valve head. A small connecting tube 205 of suitable material is interposed therebetween.

A hollow cylindrical bearing support member 208 spacedly surrounds the nozzle and one end thereof forms a radially outwardly extending flange 212 which is mounted to the engine head. A radial load bearing 214 is mounted to the outer surface 216 of bearing support member 208. The feed tube 200 is cooled by a cooling fluid which is introduced into the engine through the space 218 defined by the internal diameter of the bearing support member 208 and the circumference of the tubular nozzle. The nozzle has an outwardly extending flange 222 which is provided with suitable apertures to secure the same either directly to the combustion chamber (not shown) or to other fluid communicating means.

In operation gas moves through the feed tube 200 and enters the inlet port 188 of the valve 176. This port during rotation sequentially registers with one of six combination inlet and outlet ports 192, 194 distributed in circular array around the central axis of the valve seat and the engine head and leading to and from the cylinder head end 58. The gas drives the piston downwardly in its cylinder and thereafter it is then discharged through ports 192, 194 into passage 190 and thereafter the fluid is forced into the hollow shaft portion 184 of the conical valve from which the exhaust gas is permitted to escape through the hollow shaft of the second or inner power take-off shaft 22 to the open.

The proper port selection occurs in accordance with a predetermined cycle which permits the single inlet passage 188 of the conical valve to be swept across each of the six cylinder ports 192 during one revolution and further the valve is so timed that fluid is admitted through the inlet ports 192 of the seat and the engine head port 194 to each cylinder when the piston of the cylinder is approaching top dead center. The valve is also timed to close off the passage to any one cylinder at an appropriate time in the piston cycle. Thus gas passage 190 in the valve is arranged to register with the cylinder ports 192 so that at the appropriate time in the cycle the port 194 to the cylinder is opened to the exhaust passage and the hot gas remaining in the cylinder when the piston is above bottom dead center is expelled from the cylinder through the outlet ports 194, 192, 190 respectively.

Preferably a coolant, such as water, is used for the preservation of metal parts which are subjected to high temperatures arising from the combustion products. Such a coolant is introduced, see FIGURE 2, into the device through the annular space 218 formed by sealing member 246 surrounding the tubular hot gas nozzle 172. A face seal ring 250 secured to member 246 is provided to seal the water within space 218. In FIGURE 3, sealing member 246' is formed as a hollow casing so that if the engine is not used as a counter-rotating device a stationary coolant supply means, not shown, may be connected to bore 248 of sealing member 246'. Similarly, in a device for single rotation the bearing support 208 as shown will become part of the stationary structure and can be joined solidly to the hot gas nozzle 172. Water can then be introduced to the annular space through an opening in the support 208 with a fixed connection. The coolant then flows from the space 218 through an annular space 219 located around the hot gas nozzle as shown in FIGURE 2, or to accommodate valve configuration 182' as illustrated in FIGURE 3 through channel 219' to an annular opening 252 circumscribed on one side by the bearing support member 208, and on the other side by rotary valve head 182 and thereafter the coolant is directed to flow into annular pocket 209.

A plurality of flow channels 68 are drilled into the engine head 64 to deliver the water entering annular pocket 209 to the forward and aft section of the device. For forward section cooling the coolant flows from channel 68 into and through narrow slots 69 provided in a cylindrical ring 71 to deflect the coolant onto cylinder 58, the remainder flowing to cooling jacket space 66 bounded by cooling jacket 52. The tubular sleeve 70 surrounding the tubular stem 184 of the rotary valve, forms the inner boundary for the water jacket space 66. The slots 76 of the tubular sleeve, aforedescribed, are provided as a discharge opening for water leaving the space 66. Thus the coolant enters through the slot 76 and passes through the annular space 78 surrounding the valve stem from which point the coolant is free to flow into the tubular interior of the rotary valve by passing through apertures 80 provided in the stem portion 184 of the valve.

For aft section cooling, a channel not shown, connects the annular pocket 209 of the supporting member 208 to annular pockets 211 surrounding portions of bolts 13. The annular pocket 211 is drilled from the aft end into the engine head and O-rings 225 disposed within annular pockets 211 about bolts 13 prevent coolant from penetrating into the space 66. The annular pockets are in flow communication with radial bores 15a of the bolts. The bores 15a communicate flow from pockets 211 to radial bores 15c drilled in the casing 12, by means of intermediate bores 15b drilled through part of the central axes of the bolts 13. Thus, the coolant flows along the axes of the bolts through bores 15c into cooling jacket space 36 bounded by jacket 34. From space 36 the coolant is fed through passageways 38 and finally through radial apertures 213 into inner power take-off shaft 22. Two annular seals 215, 217 are mounted about the shaft 22 oppositely adjacent to apertures 213.

Once the coolant is in the hollow confines of the tubular stem of the inner power take-off shaft the coolant joins the exhaust gas where it serves the function of cooling the exhaust for the protection of engine components along the exhaust path. In instances where fluid of a nature producing extremely high temperatures is used, the valve head is partly cooled by channeling a portion of the coolant from space 219 through axial channel 252 in the rotary valve head 182. The channel 253 thus provides for cooling the interior of the valve head and establishes flow communication between space 219 and inner shaft 22, the latter also permits gases which may have escaped the hot gas seal to be expelled through the channel.

The coolant is expelled through shaft 22 either directly into the open or into and through specially adapted discharge lines which are not illustrated in the drawings.

Cooling is also effected by efficient utilization of lubricants in casing 12. By action of the swashplate and the reciprocating motion of the pistons, the lubricant is rapidly turned within the cylindrical body portion 14 and forced in and out of the open ends of the cylinders 58. In operation, the rapid movement of lubricant brings it alternatively in contact with the exposed surfaces of the pistons 146 and the socket joints 136 whereby considerable heat is removed by contact. To retain the lubricant within casing 12 a lubricant seal 254 is disposed in annular pocket 256 of spider member 48.

A vent tube 258 extends radially inwardly from cylindrical wall 27 of the inner shaft to the axial center of the latter enabling thereby a flow connection between the hollow casing 12 and the interior of the shaft 22, without however causing the coolant which is present in shaft 22 to rise or flow into the casing, since during operation of the device the coolant is forced radially outward leaving sufficient free breathing space near the axial center of the shaft 22 and the opening 259 of vent tube 258.

During operation of the device, the casing 12 is suitably filled with a lubricant. To prevent clogging of the vent tube 258 by the lubricant and loss of lubricant, the centrifugal separator, partially aforedescribed, is adapted to act in concert with vent tube 258 to permit only gas, such as may have accumulated in the casing through leakages, to escape through the vent. The tubular separator has a threaded portion 270 to mount the separator to the shaft. The forward end of the separator has a flange 272 into which a plurality of radially extending slots 274 are formed. The slots 274 are rectangular and form a substantially contiguous flow path with vent 258. When the shaft 22 is rotating lubricant particles may enter the slots 274 along with gaseous substance and both will be carried in the slot at a velocity approximately equal to that of the corresponding peripheral speed of the separator. The force of acceleration will tend to move the lubricant particle toward the trailing wall 275 of the slot and generally will impinge upon it and wet the same. If by chance the acceleration given to the lubricant particle is not sufficient to bring it in wetting contact with the trailing edge wall of the slot, it will be carried radially inwardly along the slot channel. As such a particle advances radially to a point near the center of rotation, its momentum achieved during the initial accelerating period will cause it to move toward the leading edge and will be deposited thereupon. Any oil particles thus deposited will form a wet film and are thereby effectively removed from the influence of inflowing gas. Further, upon wall contact, the slot arrangement will be acting on the particles in the manner of centrifugal pump vanes and the slots will throw the deposited particles back into the casing 14 by centrifugal action whereby a wide and sufficient path is kept to permit the gas to escape the pressurized casing. A vent tube 260 similar to tube 258 is positioned in the inner shaft at a location further aft. Vent 260 maintains the annular space between inner and outer shaft at exhaust pressure and channel 262 drilled through the outer shaft 16 communicates the pressure with external areas. An annular seal unit 264 is arranged with a bronze retainer 264a and O-rings 264b for sealing between the inner and outer shaft to prevent foreign substances to enter into the casing 12.

In FIGURE 3 the conical valve 176 is shown in modified form.

By reason of the pressure difference surrounding the valve 176 unequal forces are imposed upon the valve affecting the operating efficiency of the valve. For instance, such lack of pressure balance may have the effect of causing an undesirable degree of wear and tear on the valve as well as to induce gas leakage. To reduce or eliminate such undesirable features the valve head 182' is constructed to accommodate a pressure compensating piston 226.

A cylindrical graphitic piston is slideably inserted into a bore 228 formed in the semi-conical valve head 182' with the centerline of the bore being substantially perpendicular to the corresponding outside surface 230 of the conical valve. An O-ring 232 is carried in an annular groove 234 formed in the circumference of the graphitic piston and serves to seal the piston in its confining bore. The length of the piston is selected in such a manner so that a clearance 236 may be pressurized with gas from the engine inlet passage by means of a bleed channel 238. Such gaseous pressure is permitted to build up in the clearance to hold the piston in contact with the cylindrical inner surface of the surrounding bearing support member 208'.

While the engine is in operation, the various external surfaces of the conical valve are exposed to pressures of different magnitude. The space 240 adjacent to the exhaust or outlet ports, see FIGURE 3, is maintained at a relatively low pressure, that is to say the pressure depends upon the environment to which the engine is exposed and may vary from atmospheric to high pressure. The area or space 242 within the hot gas seal as well as the space 244 between the conical valve and the hot gas seal is substantially in excess of the exhaust pressure.

The small piston 226 when suitably mounted in the valve body 182 as shown produces a counterforce, that is to say a force component which is of sufficient magnitude to counteract radial or semi-radial components originating from the valve port area. There is considerable freedom in locating the piston 226 as long as proper balancing of the forces is achieved.

*Torque-Action-Reaction Principle*

The various components of the internal mechanism are preferably constructed and arranged as aforedescribed. However, there exists extensive leeway in arranging and constructing such components without deviating from the spirit of this invention.

For a better understanding of the invention and more particularly the torque action and reaction principle as embodied in the invention reference is made to FIGURES 9, 10 and 11. Numerals as used hereinbefore are applied to FIGURES 9–11 for ease of general identification and a double prime mark has been added to distinguish same.

In FIGURE 9 the invention is illustrated in an engine of a more basic design and includes a diagrammatic illustration of the forces acting upon a "free piston" arrangement, see FIGURE 9, upon its associated swashplate ring 112", upon the bearing balls 106" which provide rolling contact for the swashplate ring, and upon a swashplate cam 98" which is secured to the inner shaft 22" of the engine. A force F is impressed upon the free piston, for instance through gaseous pressure pushing the piston forceably against the swashplate ring 112. A reaction to this force is given by the swashplate ring equal to the summation of forces $m$ acting between the bearing race surfaces (see grooves 110, 108 and FIGURE 8). Since individual forces $m$ act through the points of tangency between the balls and the races, they are of necessity disposed at right angles to the plane of the swashplate ring; and the summation reaction force A applied to the piston by the ring must also be disposed at 90° to the plane of the swashplate ring. Since the force A is not directly opposite to force F, other forces acting on the piston are required for a state of balance. These forces are imposed by the cylinder walls as indicated at $h'$ and $h''$. Replacing the force A by its equivalent in vertical and horizontal components, $h$ and $v$, it becomes evident that $v$ is equal and opposite to F while $h$ is balanced by the combined action of $h'$ and $h''$. The summation of forces $m$ applied to the swashplate cam will produce a force as shown at B. As in the case of force A, B must also be at right angles to the inclined plane of the cam 98", more particularly race 108. Force B may now be replaced by its equivalent in vertical and horizontal components $v$ and $h$, these components being equal and opposite to the components of force A.

In FIGURE 10 the free piston is shown at location P, and the axis of rotation about which the shaft revolves is located at O. The axes XX and YY lie in the plane of the bearing race. Axis XX is chosen to be normal to the rotational axis, YY being inclined to it. Thus, the horizontal components $h$ of FIGURE 9 will act generally through the axis of the piston $p$ and in a direction parallel to the YY axis. All pistons not at top or bottom dead center, will be displaced from the rotational axis O by a distance $s$ and the forces $h$ will then produce a torque $h$–$s$, the force component associated with B acting to drive the inner shaft 22 in one direction of rotation and the force component associated with A acting on the cylinder to rotate the outer engine housing in the opposite direction. Since these two horizontal force components are equal in magnitude and equally displaced from the rotational axis, equal and opposite torque is applied to both the inner shaft and the outer housing.

Referring now to FIGURE 11, there is shown a force diagram as related to components disclosed in the prefered embodiment. Herein, the pistons 145″ are connected to the swashplate ring 112″ by means of connecting rod 148″ ball jointed at each end for complete freedom. Here, as in the free piston engine, a force F is imposed on the pistons by gaseous pressure and the swashplate ring provides a reaction force A acting on one end of the connecting rod in a direction normal to the plane of the ball bearing race (108). In applying the basic principle of this invention to this particular embodiment it is evident that a horizontal component such as $h'$ and $h''$, as illustrated in FIGURE 9, does not exist for balancing the horizontal component $h$ of A, the ball socket joints of the connecting rod providing complete freedom for its side movement. Unless other means are provided, the component $h$ would move the lower ball joint of the connecting rod in the direction of its action and cause the swashplate ring to rotate on its bearing relative to the outer engine housing. However, one or more of the gear teeth 140″ formed on one face of the ring are always in mesh with a mating gear 143″ secured to the engine housing. These teeth prevent relative rotary movement between the ring and the housing and thus provide a resisting force of sufficient magnitude to balance the horizontal component $h$.

Referring now to the swashplate cam 98″, secured to the inner shaft 22″, force B is the summation of forces $m$ acting through points of tangency between the balls and bearing races. Similarly as aforestated as applying to the free piston arrangement, force B and its components are equal and opposite to A and its components. The horizontal components $h$ act at points displaced from the rotational axis and produce torque, that from B being applied to the engine inner shaft 22″ and that from A to the swashplate ring. Torque applied to the swashplate ring is balanced by action of the gear teeth and, hence is transferred through the teeth to the outer engine housing.

While there have been described what at present are considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

I claim as my invention:

1. A barrel engine comprising: first and second rotatable means coaxially mounted and constructed and arranged for counter-rotation; fluid pressure inlet means positioned coaxially with respect to said rotatable means for introducing fluid pressure into said engine; motive power means including a plurality of pistons reciprocatively mounted having their stroke axis parallel to the axial center of rotation, said motive power means being constructed and arranged to translate the fluid pressure into an axial force component; means for converting the axial force component into an angular force component and to exert the latter upon both of said rotatable means whereby said first rotatable means rotates in one direction and said second rotatable means rotates in opposite direction solely by virtue of the reaction to the rotation of the first rotatable means; and means for connecting both of said rotatable means to individual work absorbing loads.

2. A barrel engine comprising: first and second rotatable means coaxially mounted and constructed and arranged for counter-rotation; fluid pressure inlet means positioned coaxially with respect to said rotatable means for introducing fluid pressure into said engine; motive power means including a plurality of pistons reciprocatively mounted having their stroke axis parallel to the axial center of rotation, said motive power means being constructed and arranged to translate fluid pressure into an axial force component; cam means in engagement with said pistons for converting the reciprocating motion of said pistons into rotary motion, said cam means being fixedly mounted to one of said rotatable means for causing the latter to rotate in one direction and solely by virtue of the reaction to this rotation causing the other rotatable means to rotate in opposite direction; and means for connecting both of said rotatable means to individual work absorbing loads.

3. A barrel engine according to claim 2, wherein said cam means is constituted by a swashplate means fixedly mounted to one of said rotatable means.

4. A barrel engine comprising, in combination: housing means; means for mounting said housing rotatably; a power take-off shaft; means for rotatably mounting said shaft coaxially with respect to said housing; a plurality of cylinders disposed in circular array about said shaft with their axes being parallel thereto; annular piston means slidably disposed in each of said cylinders; a swashplate cam means fixedly mounted to said power take-off shaft including a first and a second annular sleeve integrally superimposed upon one another, said first annular sleeve providing an inner cylindrical surface concentrically arranged with respect to said shaft, and said second sleeve having an outer periphery eccentrically arranged and at a skew angle with respect to said shaft; a ball bearing carrier ring having a plurality of radially extending apertures and secured to said second sleeve; bearing balls operably disposed within each of said apertures; annular plate means coaxially mounted to said ring, said piston means being adapted to coact with said annular plate means and to impart rotary motion thereto in response to sequential periodic reciprocation of said piston means in said cylinders to rotate said shaft in one direction and causing said housing means to rotate in the opposite direction; fluid supply and exhaust conduit means in said housing connecting each of said cylinders sequentially to a fluid source; valve means intermediately disposed between portions of said conduit means; means for rotatably mounting said valve means; and means connecting the valve means to said power take-off shaft to sequentially open and close flow communication between said conduit means and said cylinders.

5. A barrel engine comprising, in combination: first and second rotatable means coaxially mounted and constructed and arranged for counter-rotation; fluid pressure responsive means structurally associated with said first rotatable means and providing a conduit connectable to a source of fluid fuel, said responsive means including a plurality of pistons having their stroke axis parallel to the common axis of the rotatable means and effective to translate fluid pressure acting upon the pistons into an axial force component; swashplate means fixedly mounted to said second rotatable means and co-operatively arranged with respect to said fluid responsive pressure means to translate the said axial force component into an angular force component and to exert the latter upon said second rotatable means to rotate same in one direction and causing said first rotatable means to rotate in the opposite direction; a fluid inlet valve connected to and rotatable with said second rotatable means and in flow communication with said conduit of said fluid pressure responsive means and effective to control the fluid flow between the conduit and the source of fuel; and power take-off means secured, independently, to each rotatable means for rotation in unison therewith.

6. A swashplate engine comprising, in combination: a cylinder housing member having a plurality of cylinder bores extending parallel to and being arranged in circular array about the central axis of the member; piston means slidably disposed for reciprocation in the cylinder bores; an inner shaft coaxially mounted with respect to said housing member; swashplate means secured to said inner shaft and operatively associated with the reciprocable piston means; an annular valve seat member received within a tubular pocket of the housing and concentrically arranged relative to said axis, the seat member having a conically shaped inner bore and a fluid passageway extending between the inner bore and an outer surface of the seat member and connecting to one of said cylinder bores; a valve member rotatably disposed and longitudinally movable within said housing and arranged coaxial with said shaft and operatively connected for rotation therewith, said valve member including a conical portion complementary to said conically shaped inner bore of the seat, and operably received therein, said valve member having a fluid passageway to establish, sequentially, a fluid connection between said valve seat passageway and a source of fluid fuel.

7. A swashplate engine substantially as described in claim 6 wherein said conical valve portion has an included angle of 55° to 65°.

8. A swashplate engine comprising, in combination: a power take-off shaft; a housing having a plurality of cylinder bores extending in circular array about said shaft with their axis being parallel thereto; annular piston means slidably disposed in each of said cylinder bores; swashplate means secured to said shaft; means operatively connecting said swashplate means to said piston means to establish cooperation between said piston means and said swashplate means to impart rotary motion to the latter in response to sequential periodic reciprocation of said piston means in said cylinder bores; fluid supply and exhaust conduit means in said housing connecting each of said cylinder bores to a fluid source; a valve member in said housing for controlling the fluid flow in said conduit, said valve member having a head portion with a bore therein connected to one of said conduits, and a tubular portion engaging said shaft for rotation therewith; and pressure compensating means slidably disposed within said bore engaging portions of the housing.

9. A swashplate engine comprising, in combination: a power take-off shaft; a housing having a plurality of cylinder bores extending in circular array about said shaft with their axes being parallel thereto; annular piston means slidably disposed in each of said cylinder bores; a swashplate cam fixedly mounted to said power take-off shaft having an outer peripheral surface slanted at a skew angle relative to the central axis of said shaft; a ball bearing carrier ring secured to said outer peripheral surface and having a plurality of radially extending apertures; a ball bearing operably secured within each of said apertures; annular plate means coaxially mounted to said ring and in engagement with said piston means; said piston means being adapted to coact with said plate means to impart rotary motion thereto in response to sequential periodic reciprocation of said piston means in said cylinder bores; fluid supply and exhaust conduit means in said housing connecting each of said cylinder bores to a fluid fuel source; a valve member interposed between portions of said conduits to sequentially open and close fluid flow communication between the cylinder bore and the fluid fuel source, said valve member including a conically shaped head; valve seat means for mounting said valve member coaxially with respect to and within said housing, said valve seat being in engagement with said conical portion; hot gas seal means resiliently in contact with portions of said valve member; and means biasing said hot gas seal means against said valve.

10. A swashplate engine comprising, in combination: a cylinder housing member having a plurality of cylinder bores extending parallel to and being arranged in circular array about the central axis of the member; piston means slidably disposed for reciprocation in the cylinder bores; a hollow inner shaft coaxially mounted with respect to said housing member and having a vent tube within the housing and an inlet port; a valve member rotatably disposed and longitudinally movable within said housing and coaxially arranged relative to said shaft engaging said shaft for rotation therewith, said valve member having a fluid passageway to establish, sequentially, a fluid connection between the cylinder bores and a source of fluid fuel, and the cylinder bores and the inlet port of said hollow inner shaft to discharge fluids therethrough; and a centrifugal separator mounted about said inner shaft proximate to said vent tube, said separator having a plurality of fluid deflecting slots arranged to act in concert with said vent tube to permit only gas to escape through said vent upon rotation of said shaft.

11. A barrel engine comprising, in combination: first and second support means coaxially mounted and adapted to establish relative rotation; fluid pressure inlet means positioned coaxially with respect to said support means and connected to one thereof; motive power means including a plurality of pistons reciprocably mounted in one of said support means, said pistons having their stroke axis parallel to the axial center of rotation, said motive power means being constructed and arranged to translate fluid pressure into an axial force component; means on one of said support means for converting the axial force component into an angular force component and to apply effectively the angular force component upon one support means to establish said relative rotation between said first and second support means, or to apply said angular force component upon both of said support means to rotate one support means in one direction and the other support means in the opposite direction solely by virtue of the reaction to the rotation between the first and second support means.

12. A swashplate engine comprising, in combination: a rotatably mounted cylinder housing member having a plurality of cylinder bores extending parallel to and being arranged in circular array about the central axis of the member; piston means slidably disposed for reciprocation in the cylinder bores; an inner shaft coaxially mounted with respect to said housing member; swashplate means secured to said shaft and operatively associated with the reciprocable piston means to convert the reciprocatory motion into an angular force component and to exert the latter upon said shaft to rotate the shaft in one direction and causing said housing member to be rotated in the opposite direction; fluid supply and exhaust conduits in said housing connecting each of said cylinder bores to a fluid fuel source; and a rotatably mounted valve in coaxial engagement with said shaft to rotate in unison therewith and to sequentially open and close fluid communication between said conduits and said cylinders.

13. A swashplate engine comprising, in combination: a cylinder housing member having a plurality of cylinder bores extending parallel to and being arranged in circular array about the central axis of the member; piston means slidably disposed for reciprocation in the cylinder bores; an inner shaft coaxially mounted with respect to said housing member; swashplate means secured to said shaft and operatively associated with the reciprocable piston means; fluid supply and exhaust conduits in said housing connecting each of said cylinder bores to a fluid fuel source; a rotatably mounted valve engaging said shaft to rotate in unison therewith and to sequentially open and close fluid flow communication between said conduits and said cylinders; said housing member being formed of a plurality of sections including an engine head, a spider member spacedly mounted with respect to said engine head, a casing member secured to said spider member and having a tubular outer portion extending parallel to said central axis; a cooling jacket peripherally and spacedly surrounding at least one of the preceding sections and adapted to retain a cooling fluid between the jacket and the individual section; each of said cylinder bores being defined by a hollow longitudinally extending cylinder member secured to and between said engine head and said spider member.

References Cited in the file of this patent

UNITED STATES PATENTS

| | | |
|---|---|---|
| 355,814 | Esty | Jan. 11, 1887 |
| 672,263 | Dean | Apr. 16, 1901 |
| 1,151,568 | Conill | Aug. 31, 1915 |
| 1,152,004 | Canton | Aug. 31, 1915 |
| 1,274,391 | Davis | Aug. 6, 1918 |
| 1,378,855 | Gollings | May 24, 1921 |
| 1,483,199 | Schinkez | Feb. 12, 1924 |
| 2,285,476 | Wahlmark | June 9, 1942 |
| 2,396,410 | Blum | Mar. 12, 1946 |
| 2,633,104 | Lauck et al. | Mar. 31, 1953 |
| 2,861,552 | Creighton | Nov. 25, 1958 |
| 2,917,931 | Sherman | Dec. 22, 1959 |
| 2,944,529 | Wiggermann | July 12, 1960 |
| 2,969,810 | Dudley | Jan. 31, 1961 |
| 2,979,037 | Budzich | Apr. 11, 1961 |
| 2,984,223 | Budzich | May 16, 1961 |

FOREIGN PATENTS

| | | |
|---|---|---|
| 418,119 | France | Sept. 20, 1910 |
| 432,899 | France | Oct. 16, 1911 |
| 575,550 | France | Aug. 1, 1924 |